Patented Mar. 31, 1925.

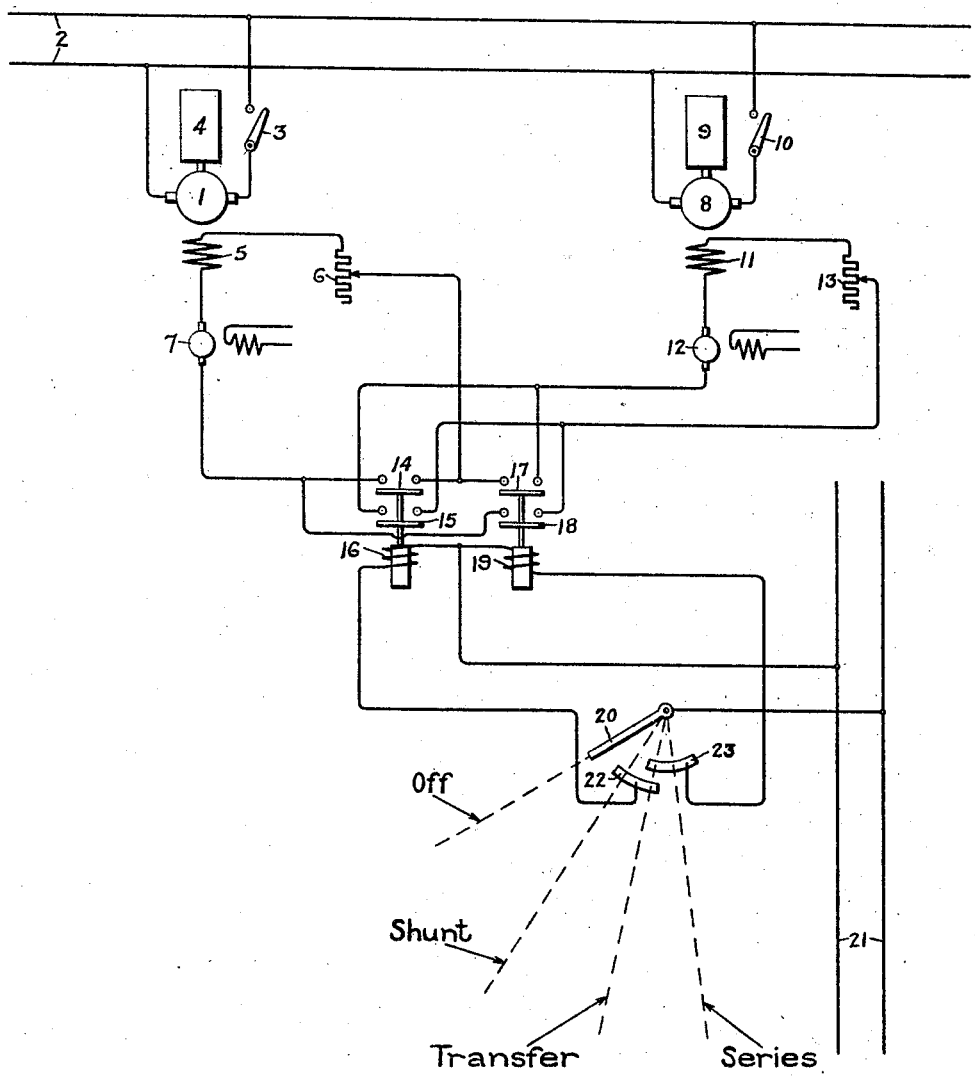

1,531,914

UNITED STATES PATENT OFFICE.

ALFRED C. FINNEY, OF SCHENECTADY, NEW YORK, ASSIGNOR TO GENERAL ELECTRIC COMPANY, A CORPORATION OF NEW YORK.

PARALLELING ELECTRODYNAMIC MACHINES.

Application filed May 27, 1924. Serial No. 716,276.

*To all whom it may concern:*

Be it known that I, ALFRED C. FINNEY, a citizen of the United States, residing at Schenectady, in the county of Schenectady, State of New York, have invented certain new and useful Improvements in Paralleling Electrodynamic Machines, of which the following is a specification.

My invention relates to systems of connections for paralleling electrodynamic machines, and has for its object the provision of an improved arrangement for insuring a proper division of load between machines which are paralleled under conditions where one of the machines has been in service long enough to reach its normal operating temperature while the other machine is cold from standing idle.

When two electrodynamic machines of similar characteristics are paralleled under conditions where one is warm and the other is cold, the cold machine, on account of its lower resistance drop, tends to assume more than its proper share of the load. For this reason it is necessary to manipulate the field resistor of the cold machine while it is being heated up to its normal operating temperature. In the case of automatic stations, it is a difficult matter to manipulate the field rheostat of a cold machine as required to maintain its load within proper limits. In accordance with my invention, this difficulty is avoided by connecting the field circuits of the warm and cold machines in series during the starting period.

My invention will be better understood on reference to the following description when considered in connection with the accompanying drawing and its scope will be pointed out in the appended claims.

Referring to the drawing, the single figure thereof shows a direct current generator 1 arranged to be interconnected with a line 2 through a switch 3, and provided with suitable driving means 4. The field winding 5 of the generator 1 is arranged to be connected through a resistor 6 to a source of excitation shown as a direct current exciter 7 which may be mounted on the generator shaft if desired. A generator 8 operably associated with a prime mover 9 is arranged to be connected to the line 2 through a switch 10 and is provided with a field winding 11 interconnected with a source of excitation 12 and a field rheostat 13.

Switches 14 and 15 operable in response to energization of the operating coil 16, and switches 17 and 18 operable in response to energization of the operating coil 19, are provided for controlling the connections of the generator field circuits in accordance with the position of the contact arm 20 which may be moved between its various operating positions, either manually or by any suitable remote control means to interconnect the coils 16 and 19 with the line 21 from which current for energizing these coils is supplied. Contact segments 22 and 23 are arranged to cooperate with the lever 20.

With this arrangement in mind, the operation of my invention will be readily understood. In the illustrated positions of the switches 3 and 10 and the lever 20, the generators and their field circuits are de-energized. To put the generator 1 into service, it is brought up to speed, its field circuit is closed by moving the member 20 to its "shunt" position, and the switch 3 is closed. Under these conditions, the field circuit of generator 1 is closed through switch 14, the field circuit of generator 8 is closed through switch 15 and the generator 1 is operated to supply current to the line 2.

If it is now desired to put the generator 8 into service, it is brought up to the proper speed and its switch 10 is closed. The generator 8 is of course cold and will therefore tend to take more than its proper share of the load. In order to equalize the loads of the generators, the member 20 is first moved to its "transfer" position where the coil 19 is energized to close the switches 17 and 18 by which points in the two generator field circuits are interconnected and then to its "series" position in which the coil 16 is de-energized and the generator field circuits are connected in series by the opening of switches 14 and 15. When this occurs, the same current transverses the field windings 5 and 11 and the cold generator 8 is prevented from assuming more than its proper share of the load. When the generator 8 has reached its normal operating temperature, the machines may be operated with their exciting circuits connected in series or the member 20 may be moved back to its shunt position, thereby separating the field circuits from one another. It will be evident that these various operations are thus performed without interruption of the generator field circuits and that the necessity of manipulating the generator field rheostats is avoided.

What I claim as new and desire to secure by Letters Patent of the United States is:—

1. A system wherein a plurality of dynamo electric machines are arranged to have their armature circuits connected in parallel and wherein the excitation circuit of each machine includes a field winding and a source for supplying current thereto, comprising excitation circuit control means, and means operable to one position for causing said circuit control means to be actuated for closing said excitation circuits independently of one another and operable to another position for causing said circuit control means to be actuated for connecting said excitation circuits in series.

2. A system wherein a plurality of dynamo electric machines are arranged to have their armature circuits connected in parallel and wherein the excitation circuit of each machine includes a field winding and a source for supplying current thereto, comprising means for controlling the excitation circuit connections of said machines, said control means being arranged to close said excitation circuits independently of one another and to connect said circuits in series while maintaining the excitation of said machine.

3. The method of controlling the division of load between a warm dynamo electric machine connected to a load circuit and a cold dynamo electric machine arranged to be connected to said circuit in parallel with said warm machine which consists in exciting each machine independently, connecting the excitation circuits of said machines in series while maintaining the excitation of said machines, connecting said cold machine to said load circuit, and closing the excitation circuits of said machines independently of one another when said cold machine has assumed its normal operating temperature.

4. A system wherein a plurality of dynamo electric machines are arranged to have their armature circuits connected in parallel and wherein the excitation circuit of each machine includes a field winding and a source for supplying current thereto, comprising a relay for closing said excitation circuits independently of one another, a second relay for connecting said excitation circuits in series, and control means operable to one position for energizing said first mentioned relay, operable to a second position for energizing the other of said relays while maintaining the energization of said first mentioned relay and operable to a third position to deenergize said first mentioned relay while maintaining the energization of the other of said relays.

In witness whereof, I have hereunto set my hand this 26th day of May, 1924.

ALFRED C. FINNEY.